(12) United States Patent
Ross et al.

(10) Patent No.: US 7,819,266 B2
(45) Date of Patent: *Oct. 26, 2010

(54) CONTAINER SEALING MATERIAL HAVING A HEAT-RELEASABLE INTERLAYER

(75) Inventors: Sue A. Ross, Elmhurst, IL (US); Bahjat Z. Yousif, Elmhurst, IL (US); Paul E. Yousif, Wheaton, IL (US); George Antar, Morton Grove, IL (US)

(73) Assignee: Tech-Seal Products, Inc., Schaumburg, IL (US)

( * ) Notice: Subject to any disclaimer, the term of this patent is extended or adjusted under 35 U.S.C. 154(b) by 1720 days.

This patent is subject to a terminal disclaimer.

(21) Appl. No.: 11/007,874

(22) Filed: Dec. 9, 2004

(65) Prior Publication Data

US 2006/0124577 A1    Jun. 15, 2006

(51) Int. Cl.
*B65D 53/00* (2006.01)
*B65D 41/00* (2006.01)
*B65D 39/00* (2006.01)
*B32B 9/00* (2006.01)
*B32B 9/06* (2006.01)

(52) U.S. Cl. .............. 215/232; 215/230; 215/347; 220/258.2; 220/359.3; 428/40.5; 428/468

(58) Field of Classification Search ............ 215/347, 215/230, 232; 220/258.1, 359.3; 428/434, 428/354, 484.1, 485, 486, 40.5; 283/51, 283/81

See application file for complete search history.

(56) References Cited

U.S. PATENT DOCUMENTS

| 3,690,909 | A | * | 9/1972 | Finley | .............. | 428/40.4 |
| 3,968,823 | A | | 7/1976 | Simon | | |
| 4,013,188 | A | | 3/1977 | Ray | | |
| 4,280,653 | A | | 7/1981 | Elias | | |
| 4,588,099 | A | | 5/1986 | Diez | | |
| 4,596,338 | A | | 6/1986 | Yousif | | |

(Continued)

OTHER PUBLICATIONS

U.S. Appl. No. 11/008,485, Yousif, et al.

(Continued)

*Primary Examiner*—Robin Hylton
(74) *Attorney, Agent, or Firm*—Olson & Cepuritis, Ltd.

(57) ABSTRACT

An container sealing material suitable for sealing a container comprises a liner sheet (liner), a sealant sheet, and an interlayer portion (interlayer) bound between the liner and the sealant sheet by individual layers of wax. The material has a closure-contacting surface and a heat-sealable surface. At least one of the surfaces of the liner and the interlayer that contacts a layer of wax is capable of absorbing liquid wax when the layer of wax is melted. At least one of the surfaces of the sealant sheet and interlayer which contacts a layer of wax is capable of absorbing liquid wax when the layer of wax is melted. The liner and the sealant sheet each release from the interlayer when sufficient heat is applied to the container sealing material to melt the layers of wax. The interlayer can include printed matter visible on one or both of its surfaces (e.g., a logo, proof-of-purchase indicator, and the like). The printed matter can include promotional indicia for a product, a service, a game and the like. Accordingly, the container sealing material provides a means for including a promotional token, such as a redeemable coupon within a container closure between the liner and the sealant sheet.

26 Claims, 3 Drawing Sheets

U.S. PATENT DOCUMENTS

| | | | |
|---|---|---|---|
| 4,666,052 A | 5/1987 | Ou-Yang | |
| 4,684,554 A | 8/1987 | Ou-Yang | |
| 4,767,654 A | 8/1988 | Riggsbee | |
| 4,778,698 A | 10/1988 | Ou-Yang | |
| 4,784,885 A | 11/1988 | Carespodi | |
| 4,861,644 A | 8/1989 | Young et al. | |
| 4,917,949 A * | 4/1990 | Yousif | 428/349 |
| 4,934,544 A | 6/1990 | Han | |
| 4,960,216 A | 10/1990 | Giles | |
| 5,004,111 A | 4/1991 | McCarthy | |
| 5,012,946 A | 5/1991 | McCarthy | |
| 5,019,436 A | 5/1991 | Schramer et al. | |
| 5,106,124 A | 4/1992 | Volkman et al. | |
| 5,197,618 A | 3/1993 | Goth | |
| 5,356,021 A | 10/1994 | McBride et al. | |
| 5,372,268 A | 12/1994 | Han | |
| 5,381,913 A | 1/1995 | Peeters | |
| 5,712,042 A | 1/1998 | Cain | |
| 5,813,563 A | 9/1998 | Boehm et al. | |
| 5,915,585 A | 6/1999 | Ladina et al. | |
| 6,032,820 A | 3/2000 | Ladina et al. | |
| 6,047,488 A | 4/2000 | Tuszkiewicz | |
| 6,082,566 A | 7/2000 | Yousif et al. | |
| 6,131,754 A | 10/2000 | Smelko | |
| 6,174,274 B1 | 1/2001 | Hawkins et al. | |
| 6,237,843 B1 | 5/2001 | Falat et al. | |
| 6,327,801 B1 | 12/2001 | Witkowski et al. | |
| 6,374,726 B1 | 4/2002 | Melton | |
| 6,670,009 B1 | 12/2003 | Voss | |
| 6,709,726 B1 | 3/2004 | Dronzek et al. | |
| 6,746,743 B2 | 6/2004 | Knoerzer et al. | |
| 2003/0099793 A1* | 5/2003 | Dronzek, Jr. | 428/35.7 |
| 2004/0043165 A1* | 3/2004 | Van Hulle et al. | 428/34.2 |
| 2006/0124574 A1* | 6/2006 | Yousif et al. | 215/232 |
| 2006/0124578 A1* | 6/2006 | Yousif et al. | 215/347 |

OTHER PUBLICATIONS

U.S. Appl. No. 11/008,495, Yousif, et al.

* cited by examiner

CONTAINER SEALING MATERIAL HAVING A HEAT-RELEASABLE INTERLAYER

FIELD OF THE INVENTION

The invention relates to improved container sealing materials. More particularly, the invention relates to multilayer sheet materials having an integrated a closure lining portion releasably attached to a container sealing portion. The invention also relates to container sealing materials including an integrated promotional token.

BACKGROUND OF THE INVENTION

It is common practice to line the inner surface of container closures with a moderately compressible material, such as a polymeric material, pulp board, or a multilayer laminated combination thereof. When a closure, containing the liner material, is secured to the finish of a container, such as by applying a torque force to a threaded closure that is engaged with a threaded container finish, the resulting pressure of the closure on the liner, which is interposed between the closure and the container finish, produces a substantially liquid and/or gas-tight seal. When the closure is removed from the container, the liner remains within the closure. Re-engaging the closure with the container finish re-establishes the seal. Liner materials can utilize a pulp or paper substrate or polymeric materials, such as polyolefin foams or laminated multilayer lining materials comprising a combination of pulp or a polymeric foam along with a polymeric film.

In a typical application, closures for containers are lined with a laminated material having a layer of pulp mounted to a layer of aluminum foil by an intermediate wax layer. Such laminated materials also frequently contain a layer of polymer, such as a polyester film, fixed by an adhesive to the foil, and a layer of sealing material fixed by an adhesive to the polyester film. The laminate is produced and shipped as a roll of the sheet material. The roll is slit to the width required by the customer, a container seals are then die cut from the slit roll and then in a closure.

In use, the resulting lined closure is torqued onto a container, such as a bottle or jar, which has been filled with a fluid or solid product. Next, the capped container is passed through a high frequency induction heating unit. During induction heating, the aluminum foil is heated to a temperature in excess of about 65° C., generally about 150° C. or greater, which melts the wax in the layer between the pulp and aluminum foil. The melted wax is absorbed by the pulp, causing the pulp to separate from the remainder of the material. The sealing material (also sometimes referred to as an "innerseal") typically is selected to match the material of construction of the container, and is heat welded or sealed to the rim of the container (i.e., the container finish) during induction heating process. When a consumer removes the closure from the container, the pulp layer remains in the closure as a liner, leaving the foil, polymer film, and sealing material on the container as a seal to prevent leakage and contamination of the container contents during storage and shipment, and/or to provide evidence of tampering.

An integrated liner and innerseal combination is disclosed in Yousif U.S. Pat. No. 4,596,338. The integrated liner and innerseal combination disclosed in that patent provides an air-permeable paper seal to overcome problems associated with pressure changes within the container due to changes in temperature. Another liner/innerseal combination is disclosed in Cain U.S. Pat. No. 5,712,042, which also discloses a paper layer as the innerseal.

U.S. Pat. No. 6,082,566 to Yousif et al. describes an integrated liner and innerseal combination comprising a transparent innerseal temporarily bound to a chemically resistant liner by a layer of wax. The liner includes a support material such as a layer of cellulose pulp, a chemically resistant polymer layer, an aluminum foil layer between the support and the polymer layer. A synthetic fabric layer, such as spunbonded high density polyethylene, is adhesively secured to the chemically resistant polymer layer. A layer of wax binds the synthetic fabric layer to a layer of heat-sealable polymer. When a disk of the material is placed in a container closure (support layer first) and the closure is secured to the finish of a container, the sealed container can be run through an induction sealing unit to heat the aluminum foil, causing the heat-sealable polymer to bind to the container finish and also causing the wax to melt. When the wax melts, it is absorbed by the synthetic fabric, thus separating the liner from the innerseal, so that upon removal of the closure, the liner remains in the closure and a transparent innerseal (e.g., the heat-sealable film) remains secured over the finish of the container. Such integrated liner and innerseal combinations provide a clear, transparent innerseal, in which the absorbent synthetic fabric layer remains in the liner. Variations on this design in which the synthetic fabric layer is replaced by a layer of paper are also known.

U.S. Pat. No. 6,161,754 describes an integrated liner and innerseal material in which a wax absorbent layer is a synthetic fabric laminated to the lower surface of a liner and having an aluminum foil layer as part of the innerseal portion. These materials provide an opaque innerseal, which prevents the contents of the container from being viewed when an opaque container is utilized.

There is an ongoing need for improved container sealing materials having a clear, transparent seal so that the contents of the container can be viewed through the innerseal, particularly when an opaque container is used. In some applications, it is also desirable to have a liner with a non-absorbent surface in direct contact with the contents of the container, rather than an absorbent fabric or paper layer. Such applications include, for example, when the contents of the container includes volatile materials or liquid substances that can be absorbed by the fabric or paper.

Modern packaging and advertizing often makes use of promotional materials, such as coupons, sweepstakes, games, and the like, to promote products, services, political or social causes, and the like. In many cases, this requires placing the coupon or other promotional material on the exterior of the container, where it is easily removed by individuals who did not purchase the product. This has led some to place coupons inside the product container. When the product is a food or drug item, any coupon that contacts the contents of the container must be printed with an FDA approved ink, or must be sealed in a hermetic pouch, both of which add to the expense of the promotional materials. It would be very useful to be able to place a readily retrievable coupon or other promotional material within a container closure. Some specialized closures have been developed, which have chambers for sealing promotional materials inside the closure itself, however, such specialized closures are expensive and can be complicated to manufacture. Accordingly, there is an ongoing need for ways to conveniently include promotional materials, such as a coupon, within a container closure. There is also an ongoing need for improved container sealing materials that provide functional features such as tamper evidence, preservation of product quality, packaging integrity, and the like.

The present invention provides promotional materials integrated with a container seal, so that the promotional material (i.e., a promotional token) can be included within the container closure and not in contact with the contents of the container. While container seals are a regulatory requirement for many food and drug applications, the container seals of the present invention turn this regulatory requirement into a marketing asset by integrating useful promotional materials into the container seal. The container sealing materials of the present invention can be used with standard, conventional closures to provide promotional materials such as coupons within the closure, without need for expensive, specialty closures with sealed chambers.

SUMMARY OF THE INVENTION

A container sealing material of the present invention comprises a liner sheet (liner), a sealant sheet, and an interlayer bound between the liner sheet and the sealant sheet by individual layers of wax. At least one of the liner and the interlayer surfaces that contacts the layer of wax between of the liner and interlayer is composed of a material that is capable of absorbing liquid wax (i.e., a wax-absorbent material). Similarly, at least one of the sealant sheet or interlayer surfaces that contacts the layer of wax between the interlayer and the sealant sheet is also capable of absorbing liquid wax. The liner has a closure-contacting surface and the sealant sheet has a heat-sealable surface. The closure-contacting surface of the liner forms one outer surface of the container sealing material, while the heat-sealable surface of the sealant sheet forms the other outer surface of the container sealing material. The liner sheet includes a layer of compressible material, such as pulp board or a polymeric foam. The compressible material can be resilient, if desired. The absorbent surfaces in contact with the wax layers preferably comprise paper or a synthetic fabric, such as a nonwoven fabric, a microporous polymeric film, and the like. In some preferred embodiments, at least one of the liner, interlayer, and innerseal portions includes a layer of metal foil, such as aluminum foil.

When the container sealing material is heated to a temperature at or above the melting point of the wax layers, melted wax is absorbed by an absorbent surface in contact with the wax, causing the liner and the sealant sheet both to release from the interlayer. Accordingly, the wax layers and the interlayer together act as a temporary tie layer between the liner sheet and the sealant sheet of the material. In addition, sufficient heat is applied to the container sealing material to bond the heat-sealable surface of the sealant sheet to a container finish.

The interlayer preferably includes printed matter visible on one or both of its surfaces. The printed matter can include a logo, a trademark, an informational message, promotional indicia, and the like. Preferably, the printed matter includes promotional indica for a product, a service, a game (e.g., a contest, a sweepstakes, and the like), a company, and organization, a political or social cause, and the like. Accordingly, the container sealing material of the present invention provides a novel means for including a readily retrievable promotional token, such as a redeemable coupon, within a container closure between the liner and the seal over the access opening of the container. Optionally, the liner and/or the sealant sheet can include printed matter visible on a surface thereof.

Each of the liner, interlayer, and sealant sheet portions independently can be a single layer of material, or a multilayer structure, provided that there is at least one layer of absorbent material capable of absorbing liquid wax in contact with each layer of wax. Preferred liner, interlayer, and sealant sheet portions independently include a single layer of material, or two to five layers of material laminated together to form an integral sheet material. For example, in one illustrative embodiment, the liner can be a single layer of polymeric foam, the interlayer can be a single layer of paper with a redeemable coupon printed on one of its surfaces, and the sealant sheet can be a single layer of polymer film; whereas in another embodiment, the liner can comprise multiple layers (e.g., a layer of cellulose pulp at is closure-contacting surface, a layer of polymer film, and a layer of aluminum foil therebetween). The interlayer can be a single layer of microporous polyethylene film having a game token or coupon printed one of its surfaces, or a multilayer structure comprising two or more layers of sheet materials such as polymeric films, wax-absorbent materials, metal foils, and the like. The sealant sheet can comprise two layers or more layers of sheet materials (e.g., a barrier film laminated to a heat-sealable film). Preferably, at least one of the liner, the interlayer, and the sealant sheet includes a layer of metal foil, such as aluminum foil.

In use, the container sealing material is cut into the form of a container seal sized to fit within a closure for a container (e.g., a lid) and to cover the access opening of the container. The container seal is placed in the closure with its closure-contacting surface facing into the closure. Generally, the closure-contacting surface is adhesively secured to the closure using a suitable adhesive, such as a hot-melt adhesive, although it can be held in the closure by friction, if desired. The closure, with its fitted container seal, is then secured over the access opening of the container finish, such as a bottle or jar, which has been filled with a product. Heat energy is then applied to the container seal. The amount of heat energy supplied to the container seal is selected to raise the temperature of the wax layers above their melting point and to bond the heat-sealable surface of the sealant sheet to the container finish. When the wax layers melt, a sufficient quantity of the wax from each layer of wax is absorbed by an absorbent tacking surface in contact with the wax to release both the liner and the sealant sheet from the interlayer. When a consumer removes the closure from the container, the liner remains in the closure, the sealant sheet remains affixed over the access opening of the container as a seal, while the interlayer is loosely disposed between the liner and the sealant sheet, making it readily retrievable by the consumer. Preferably, the interlayer includes promotional indicia visible on one of its surfaces, although embodiments without such promotional indicia are also encompassed by the present invention.

DETAILED DESCRIPTION OF PREFERRED EMBODIMENTS

Figure 1:
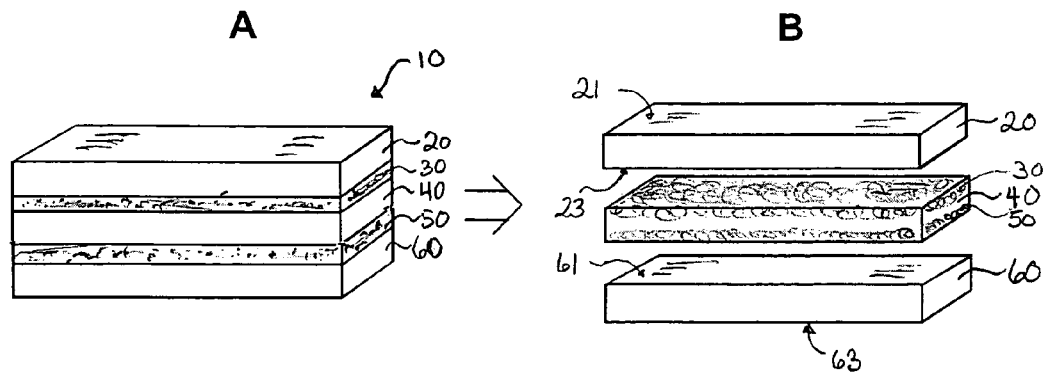
FIG. 1 is a schematic diagram of a container sealing material of the present invention. Panel A illustrates the container sealing material with wax layers binding the liner and sealant sheet portions to the interlayer portion. Panel B shows the release and separation of the liner sheet and the sealant sheet from the interlayer portion after heat has been applied to the material to melt the wax layers.

As used herein, the term "closure" and grammatical variations thereof, refers to a lid or cap, such as a threaded cap, a lug-type cap, a snap-cap, and the like, that is designed to be repeatedly secured to and removed from a container finish, such that when the cap or lid is secured to the container finish, a seal is formed that protects the contents of the container from contamination and leakage.

The terms "lining material" and "liner" refer to a container sealing material that is compressible and preferably semi-rigid, and is suitable for use within a closure to provide a resealable seal between the closure and a container finish. The term "liner" also refers to a section of lining material that has been cut to fit snugly within a closure against the upper inside surface thereof.

The terms "innerseal" and "seal" refer to a film or sealant sheet that is adhesively secured or heat-sealed over the finish of a container to provide air and/or fluid tight seal. A sealant sheet can be a single-layer or multilayer structure. Containers also typically are fitted with a closure over the sealant sheet so that when the closure is removed, the sealant sheet remains sealed over the container finish, and must be physically punctured or peeled off to access the contents of the container. The closure typically includes a liner so that after the sealant sheet is removed, and the closure is put back on the container a tight seal will be obtained. The term "container seal" generally refers to a material used to seal a container, and includes an innerseal, a liner, and an integrated liner and sealant sheet material that has been cut to fit within a container closure.

The term "wax", as used herein and in the appended claims is not limited to natural waxes and parafins, but also encompasses materials commonly referred to as waxes in the packaging and converting industries, such as microcrystalline wax, polyethylene wax, polyisobutylene resins, and so-called synthetic waxes, such as amide waxes, amide waxes, as well as mixtures thereof.

A container sealing material of the present invention comprises a liner sheet, a sealant sheet, and an interlayer portion bound therebetween. The liner sheet has a closure-contacting surface and a tacking surface, and comprises at least one layer of a compressible material, such as a layer of cellulose pulp or a polymeric foam. The interlayer portion has a first tacking surface and a second tacking surface. The sealant sheet has a tacking surface and a heat-sealable surface. The tacking surface of the liner sheet is bound to the first tacking surface of the interlayer portion by a first layer of wax. The tacking surface of the sealant sheet is bound to the second tacking surface of the interlayer portion by a second layer of wax. Accordingly, one surface of the container sealing material of the invention is the closure-contacting surface of the liner sheet, while the other surface of the container sealing material is the heat-sealable surface of the sealant sheet.

At least one of the tacking surface of the liner sheet and the first tacking surface of the interlayer portion comprises an absorbent material that is capable of absorbing liquified wax (i.e., a wax-absorbent material). The wax-absorbent material is selected so that is can absorb a sufficient amount of wax from the first layer of wax to cause the liner sheet to release from the interlayer portion when the first layer of wax is melted. Similarly, at least one of the tacking surface of the sealant sheet and the second tacking surface of the interlayer portion is also capable of absorbing a sufficient amount of wax from the second layer of wax to cause the sealant sheet to release from the interlayer portion when the second layer of wax is melted. Some of the heat energy supplied to the container sealing material also raises the temperature of the heat-sealable container-contacting surface of the sealant sheet to a level sufficient to bond the sealant sheet to the container finish. Preferably, the liner sheet releases from the interlayer portion at substantially the same temperature at which the sealant sheet releases from the interlayer portion and at which the sealant sheet bonds to the container finish.

One preferred embodiment of the container sealing material of the invention comprises a liner sheet, a sealant sheet, and an interlayer portion bound therebetween. The liner sheet has a compressible closure-contacting surface and a tacking surface. The interlayer portion has a first tacking surface and a second tacking surface. The sealant sheet has a tacking surface and a heat-sealable container-contacting surface. The tacking surface of the liner sheet is bound to the first tacking surface of the interlayer portion by a first layer of wax and the tacking surface of the sealant sheet is bound to the second tacking surface of the interlayer portion by a second layer of wax. At least one of the tacking surface of the liner sheet and the first tacking surface of the interlayer portion comprises a wax-absorbent material and at least one of the tacking surface of the sealant sheet and the second tacking surface of the interlayer portion comprises a wax-absorbent material. In this embodiment, at least one of the liner, interlayer, and sealant sheet portions includes a layer of metal foil, such as aluminum foil.

A container seal can be fashioned from the sealing material of the invention by cutting the material to fit over the access opening of a container. The container seal is placed in a container closure and the closure is secured over the finish of a filled container. The closed container is then passed through an induction sealing device, which uses radio frequency energy to inductively heat the metal foil layer. Heat from the foil melts the first and second wax layers and bonds the heat-sealable surface to the container finish. A sufficient amount of liquid wax from the each layer of wax is absorbed by the wax-absorbent material contacting the wax layer, causing the liner sheet and the sealant sheet both to release and separate from the interlayer portion. The liner sheet and the sealant sheet each release from the interlayer portion at substantially the same temperature at which the heat-sealable surface of the sealant sheet bonds to the container finish with which it is in contact.

Referring now to the Drawings, wherein similar reference-numbers refer to correspondingly similar components, FIG. 1 schematically shows an illustrative embodiment of a container sealing material 10 of the present invention. Container sealing material 10 comprises liner 20 and sealant sheet 60 with an interlayer 40 bound therebetween. Liner 20 preferably comprises a compressible layer of polymeric foam or cellulose pulp and can include one or more layers of materials such as paper, synthetic fabric, polymeric film, and/or metal foil. Sealant sheet 60 preferably comprises a polymer film, such as a barrier film, a heat-sealable film, or a combination thereof. Sealant sheet 60 also can include one or more layer of paper, synthetic fabric, and/or metal foil. In this embodiment, interlayer 40 preferably comprises a layer of paper or synthetic fabric. Alternatively, interlayer 40 can comprise a single layer of material or can be a multilayer structure comprising a layer of wax-absorbent material at each surface thereof with one or more layers of polymeric film or metal foil therebetween. Liner 20 and sealant sheet 60 are each bound to opposite surfaces of wax-absorbent interlayer 40 by layers of wax 30 and 50.

Panel A of FIG. 1 illustrates container sealing material 10, which has a closure-contacting surface 21 and a heat-sealable container-contacting surface 63. Panel B shows container sealing material 10 of Panel A after wax layers 30 and 50 have been melted and absorbed by interlayer 40. In Panel B, liner 20 and sealant sheet 60 each have released and detached from interlayer 40. Panel B also shows closure-contacting surface 21 of liner 20 facing upward in the drawing, with tacking surface 23 of liner 20 facing interlayer 40. First tacking surface 41 of interlayer 40 is absorbent and faces liner 20, while second tacking surface 43 is also absorbent, and faces sealant sheet 60. Similarly, tacking surface 61 of sealant sheet 60 faces interlayer 40 and container-contacting surface 63 of sealant sheet 60 faces downward in the drawing.

Figure 2:
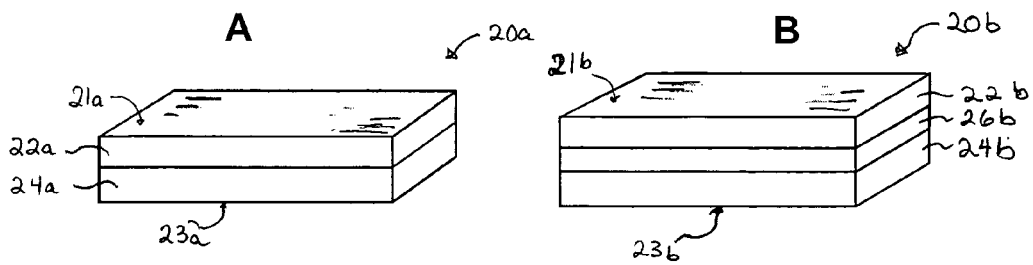
FIG. 2 illustrates two embodiments of a liner sheet. Panel A shows a two-layer liner. Panel B shows a three-layer liner.

Two embodiments of a liner sheet (20a and 20b) are shown in FIG. 2. Panel A shows a two-layer liner having a closure-contacting surface 21a and a tacking surface 23a. Liner 20a comprises compressible substrate 22a and facing layer 24a bonded thereto. Substrate 22a can comprise any compressible material suitable for use in closure liners, such as cellulose pulp, polymeric foam, and the like. Facing layer 24a can be a polymer film, a metal foil, or a layer of liquid-wax absorbent material such as paper or a synthetic fabric. Panel B illustrates a three-layer liner 20b. Liner 20b has a closure-contacting surface 21b and a tacking surface 23b. Liner 20b comprises compressible substrate 22b and facing layer 24b, with a core layer 26b bound therebetween. Substrate 22b can comprise any compressible material suitable for use in closure liners, as described above for substrate 22a. Facing layer 24b and core layer 26b each independently can be a polymer film, a metal foil, or a wax-absorbent material as described above for facing layer 24a. In one preferred liner substrate 22b is a layer of cellulose pulp or polymeric foam, core layer 26b is a layer of metal foil, and facing layer 24b is a polymeric film.

Figure 3:
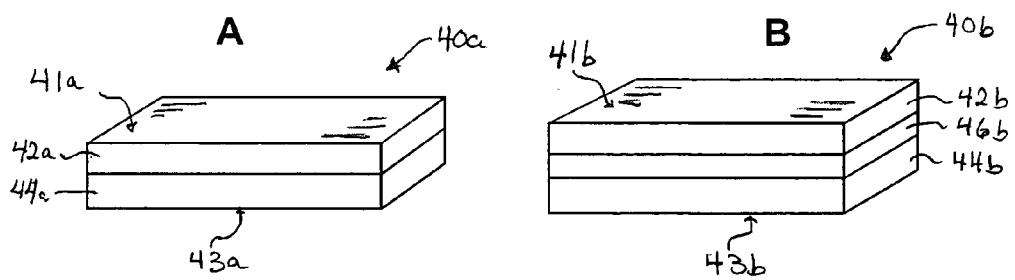
FIG. 3 illustrates two embodiments of an interlayer portion. Panel A shows a two-layer interlayer portion. Panel B shows a three-layer interlayer portion.

Two embodiments of an interlayer portion (40a and 40b) are shown in FIG. 3. Panel A shows a two-layer interlayer portion having a first tacking surface 41a and a second tacking surface 43a. Interlayer 40a comprises a first facing layer 42a and second facing layer 44a bonded thereto. Facing layers 42a and 44a each independently can comprise a polymeric foam, a polymer film, a metal foil, or a layer of wax-absorbent material, such as paper or a synthetic fabric. Preferably, at least one of the tacking surfaces 41a and 43a of interlayer 40a includes printed matter, such as promotional indicia visible on the surface thereof. Panel B illustrates a three-layer interlayer portion 40b. Interlayer 40b has a first tacking surface 41b and a second tacking surface 43b. Interlayer 40b comprises first and second facing layers 42b and 44b, respectively, with a core layer 46b bound therebetween. First and second facing layers 42b and 44b and core layer 46b each independently can comprise any of the materials as described above for facing layers 42a and 44a. Preferably, at least one of the tacking surfaces 41b and 43b of interlayer 40b includes printed matter, such as promotional indicia visible thereon.

Figure 4:
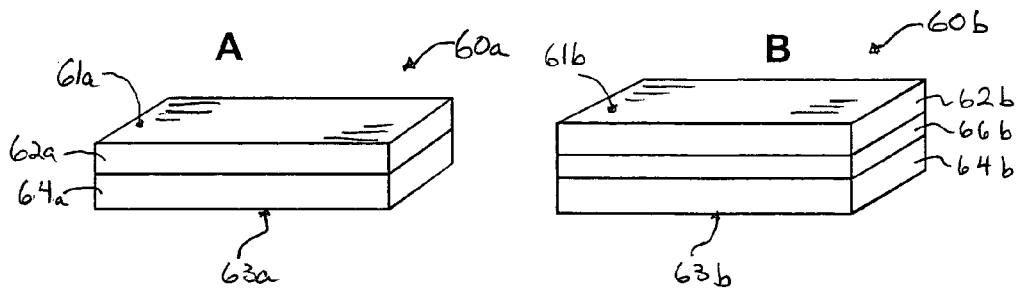
FIG. 4 illustrates two embodiments of a sealant sheet. Panel A shows a two-layer sealant sheet. Panel B shows a three-layer sealant sheet.

Two embodiments of a sealant sheet (60a and 60b) are shown in FIG. 4. Panel A illustrates a two-layer sealant sheet having a tacking surface 61a and a heat-sealable surface 63a. Sealant sheet 60a comprises a facing layer 62a and heat-sealable film 64a bonded thereto. Facing layer 62a can comprise a polymeric foam, a polymer film (e.g., a barrier film), a metal foil, or a layer of wax-absorbent material, such as paper or a synthetic fabric. In one preferred sealant sheet, facing layer 62a is a polymeric barrier film and sealing layer 64a is a heat-sealable polymer film. Panel B illustrates a three-layer sealant sheet portion 60b. Sealant sheet 60b has a tacking surface 61b and a heat-sealable surface 63b. Sealant sheet 60b comprises facing layer 62b and heat-sealable film 64b with a core layer 66b bound therebetween. Facing layers 62b and core layer 66b each independently can comprise any of the materials as described above for facing layer 62a.

The container sealing materials of the present invention can include any combination of single-layer, or multi-layer liner, interlayer, and sealant sheet portions, as described above, provided that (a) at least one of the tacking surfaces of the liner and interlayer in contact with the first layer of wax therebetween is capable of absorbing a sufficient quantity of wax from the first layer of wax to cause the liner to release from the interlayer when the first layer of wax is melted; and (b) at liner to release from the interlayer when the first layer of wax is melted; and (b) at least one of the tacking surfaces of the sealant sheet and interlayer in contact with the second layer of wax therebetween is capable of absorbing a sufficient quantity of wax from the second layer of wax to cause the sealant sheet to release from the interlayer when the second layer of wax is melted. In addition, any of the liner, interlayer, and sealant sheet portions described herein can include one or more additional layers of material, such as a polymer film, a metal foil, a layer of paper, a layer of synthetic fabric, and the like, if desired.

Figure 5:
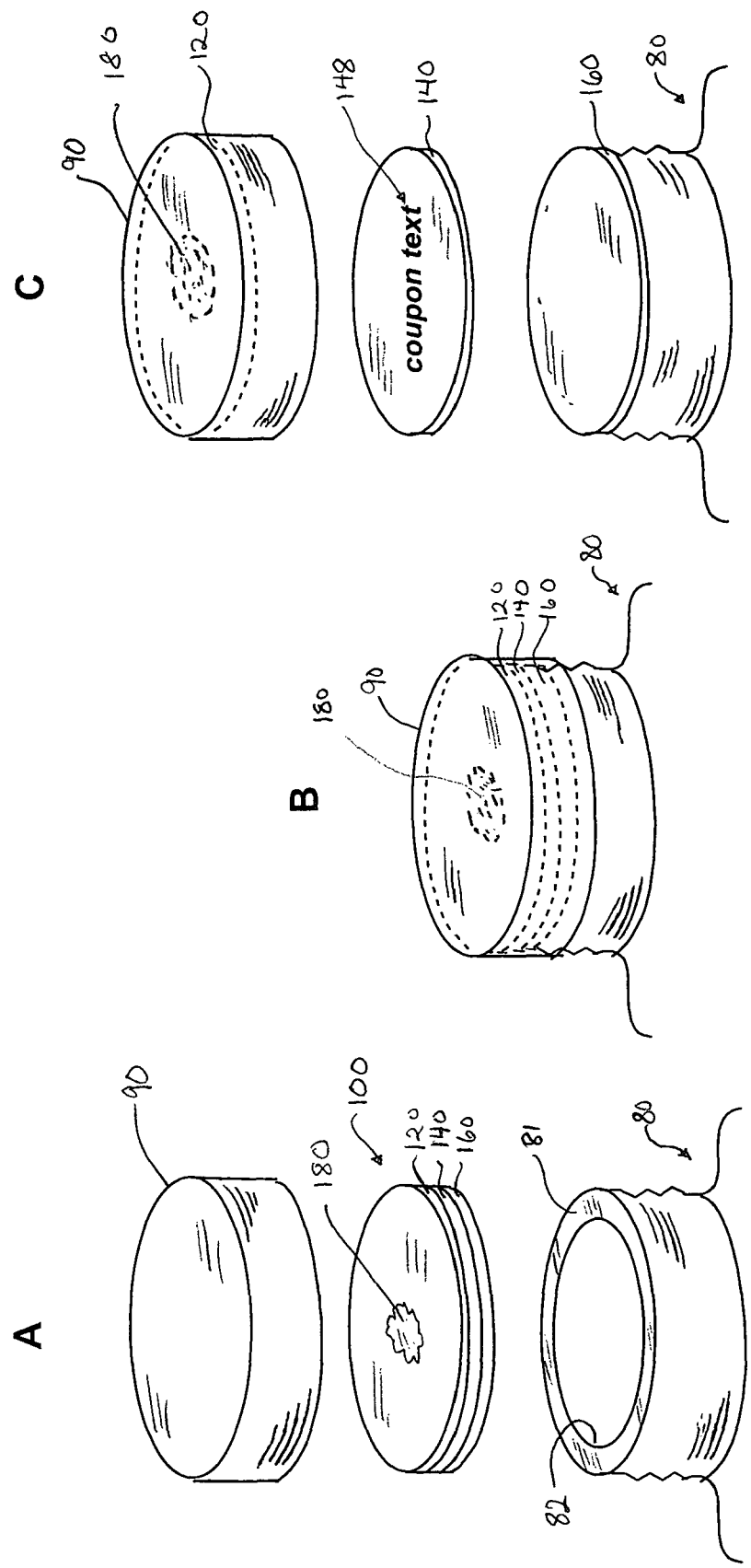
FIG. 5 illustrates the use of a container sealing material of the present invention as a container seal to provide a redeemable coupon under the closure of the container. Panel A is an exploded perspective view showing the finish of a container, a container seal of the invention, and a closure for the container. Panel B shows the container seal between the finish of the container and the closure. Panel C is an exploded perspective view of the sealed container after the liner and sealant sheet of the container seal have released from the interlayer, showing the sealant sheet secured over the container finish, the liner secured within the closure, and the retrievable interlayer portion with a coupon visible on its upper surface, loosely disposed between the liner and the sealant sheet.

FIG. 5 illustrates the use of a container sealing material as a container seal. Panel A is an exploded view showing a container 80 defining an access opening 82, and having a finish 81 surrounding access opening 82. Container seal 100 is sized to at least fit over access opening 82 and finish 81 of container 80. Container seal 100 is oriented with sealant sheet portion 160 facing container finish 81 and liner sheet 120 facing closure 90. Liner 120 and sealant sheet 160 are separated by interlayer 140, which is bound between liner 120 by a first layer of wax (not shown) and to sealant sheet 160 by second layer of wax (not shown). A spot of adhesive 180 is disposed on top of liner 120 for securing liner 120 to the inside of closure 90.

Panel B of FIG. 5 shows container 80 with container seal 100 sealed disposed over access opening 82 and closure 90 secured over container seal 100. Sealant sheet 160 is bound to container finish 81, and liner 120 is bound to closure 90 by a spot of adhesive 180. After the closure 90 and container seal 100 are secured over access opening 82, a sufficient amount of heat is applied to container seal 100, as described in detail hereinbelow, to bond sealant sheet 160 to container finish 81 and to the melt the wax layer between liner 120 and interlayer 140 and the wax layer between sealant sheet 160 and interlayer 140, causing both liner 120 and sealant sheet 160 to release from interlayer 140.

Panel C of FIG. 5 illustrates the release and separation of liner 120 and sealant sheet 160 from interlayer 140 when closure 90 is subsequently removed from container 80 by a consumer. Sealant sheet 160 remains bound to container 80, providing a seal over access opening 82. Interlayer 140, which includes a promotional coupon 148 visible on one of its surfaces, is loosely disposed between sealant sheet 160 and liner 120, so that interlayer 140 is readily retrievable by the consumer when closure 90 is removed from container 80. Liner 120 remains in closure 90 and provides a compressible surface for resealing container 80 when closure 90 is re-secured over container finish 81 after sealant sheet 160 has been removed.

Figure 6:
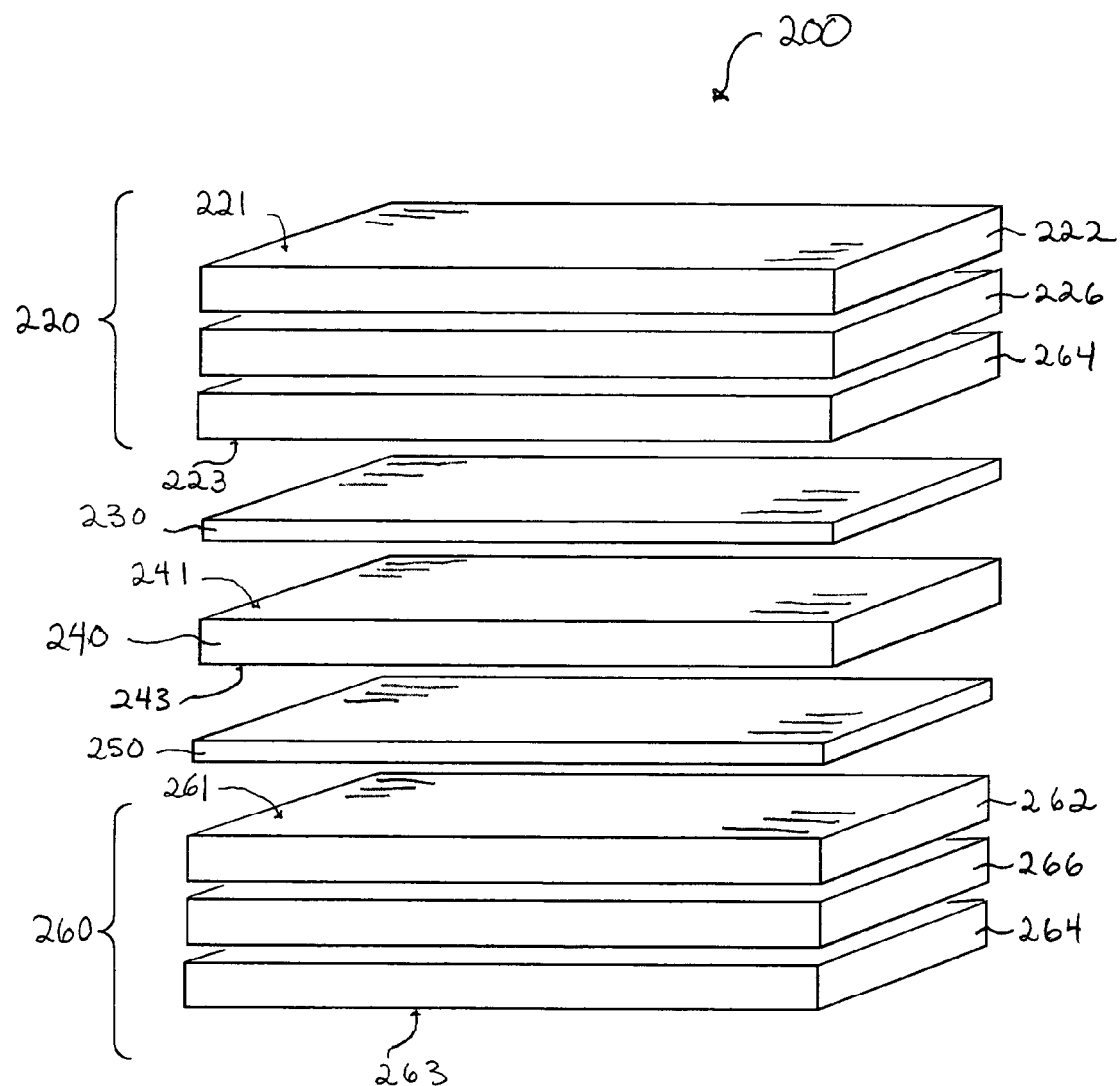
FIG. 6 illustrates an embodiment of the container sealing material of the present invention in exploded view.

FIG. 6 schematically illustrates an exploded view of an illustrative, inductively heat-sealable, container sealing material 200 of the present invention. Container sealing material 200 comprises liner 220 and sealant sheet 260, with interlayer 240 bound therebetween. Liner 220 has a closure-contacting surface 221 and a tacking surface 223. Liner 220 comprises a compressible substrate 222, which preferably is a layer of cellulose pulp or a layer of polymeric foam. Liner 220 also includes a facing layer 224, which preferably is a polymeric film. A core layer 226 of metal foil (e.g., aluminum foil) is adhesively bound between substrate 222 and facing layer 224. Interlayer 240 comprises a wax-absorbent material (e.g., paper or a synthetic fabric) and has a first tacking surface 241 and a second tacking surface 243. Sealant sheet 260 has a tacking surface 261 and a heat-sealable surface 263. Sealant sheet 260 preferably comprises an optional facing layer 262 and a sealing layer 264 with a core layer 266 between layer 264 and layer 262. Facing layer 262 preferably is a barrier film (e.g., an oxygen barrier, moisture barrier, and the like). Sealing layer 264 is a heat-sealable polymer film. Preferably, facing layer 262 and sealing layer 264 are each substantially transparent. In some embodiments, facing layer 262 can be omitted and sealant sheet 260 can consist of a single layer 264 of heat-sealable film.

Tacking surface 223 of liner 220 is bound to first tacking surface 241 of interlayer 240 by a first layer of wax 230, while second tacking surface 243 of interlayer 240 is bound to tacking surface 261 of sealant sheet 260 by a second layer of wax 250. First and second tacking surfaces 241 and 243, respectively, of interlayer 240 are capable of absorbing a sufficient quantity of wax from the first and second layers of wax 230 and 250, respectively, to cause liner 220 and sealant sheet 260 both to release from interlayer 240 when wax layers 230 and 250 are melted.

In use, a container sealing material of the invention can be die-cut to form a container seal having appropriate dimensions for use with particular container and closure. The container seal is placed within a container closure (e.g., a cap) as a single unit. The container seal is sized to fit securely within the closure and to cover the access opening of the container. The container seal is placed in the closure with its closure-contacting surface facing inward and contacting the inside top of the closure. The closure-contacting surface of the container seal can be held in place in the closure by friction or can be bound to the inside top of the closure by an adhesive, such as a hot-melt adhesive. The closure is then secured to the finish of a container (e.g., a bottle or ajar), for example, by torquing a threaded closure onto a threaded finish of a container after the container has been filled with a product. Next, heat energy is applied to the container seal to melt the wax layers and release the liner and sealant sheet from the interlayer. The heat-sealable surface is sealed to the container finish using a portion of the heat energy applied to the container seal.

When at least one of the liner, interlayer, or sealant sheet includes a metal foil layer, or when a metal closure is utilized to seal the container, heating of the container seal can be accomplished inductively. In the inductive heating process, the container is passed through an induction-sealing device in which radio frequency energy inductively heats the metal foil (or metal closure), preferably to a temperature in the range of about 65 to about 150° C. The heat from metal foil or closure liquefies each of the layers of wax. A sufficient quantity of liquid wax from each wax layer is then absorbed by an absorbent tacking surface in contact with the wax, causing the interlayer to release and separate from the liner and the sealant sheet. The heat also softens the heat-sealable film at the container-contacting surface so that the sealant sheet binds to and seals the container finish. The wax layers that bind the liner and sealant sheet to the interlayer preferably are selected to have a melting point in the range of about 65 to about 150° C. Alternatively, heat can be supplied to the container conductively, using conventional heating devices.

Upon removal of the closure by a consumer, the liner remains in the closure, while the sealant sheet remains bound to the finish of the container as a protective seal. In some forms, the seal provides evidence of product tampering. The interlayer remains loosely disposed between the liner and the sealant sheet, and can be readily retrieved by the consumer when the closure is removed. In a preferred embodiment, the interlayer includes printed matter, such as promotional indicia, visible on either or both of its surfaces, providing a promotional token for use by the consumer.

Preferably, the substrate layer of the liner is a compressible material, such as a cellulose pulp material, a polymeric foam, or a polymeric film or sheet. Preferred polymeric foams include a polyolefin foam, a substituted polyolefin foam, or a polyurethane foam. Suitable polyolefin foams include foams of polyethylene, polypropylene, ethylene propylene copolymers, and blends thereof. Non-limiting examples of suitable substituted polyolefins include polystyrene foam, polyvinyl chloride foam, and foam rubber. Preferably the polyolefin foam is a polyethylene foam, more preferably a low-density polyethylene foam.

Preferably the liner sheet has a thickness in the range of about 15 to about 60 mils (thousandths of an inch), and more preferably about 20 to about 40 mils.

Cellulose pulp-based substrates, which are commonly used in closure liners, can be laminated to other materials such as a metal foil, a polymer film, or to a foil/film laminate using conventional lamination techniques that are well known in the art.

Polymeric foams useful as a substrate layer in the container sealing materials of the present invention can be secured to other layers of material, such as a metal foil, paper, synthetic fabric, or polymer film, by lamination or by extruding the foam directly onto a web of the other material. Methods of extruding polymeric foams are well known in the polymer art. For example, methods of producing polymeric foams are described in A. Brent Strong, *Plastics Materials and Processing*, 2nd Ed., Prentice Hall Inc., Upper Saddle River, N.J., Chapter 17, pp. 589-614 (2000), the disclosure of which is incorporated herein by reference. The polymeric foams can be manufactured using any known foaming process, e.g., by mechanical foaming, chemical foaming, physical foaming, and the like. Preferably, the polymeric foam is formed by chemical foaming with a blowing agent. Blowing agents are well known in the polymer arts.

Suitable blowing agents include the following chemicals designated by the U.S. Environmental Protection Agency as suitable replacements for chlorofluorocarbons (CFC's) and hydrochlorofluorocarbons (HCFCs) for use as blowing agents in polyolefin foams:

Methylene chloride (dichloromethane);
1,1,1,2-tetrafluoroethane (HFC-134a);
1,1,-difluoroethane (HFC-152a);
1,1,1-trifluoro 2,2-dichloroethane (HCFC-123);
1,1,1-trifluoroethane (HFC-143a);
1,1,1,3,3-pentafluoropropane (HFC-245fa);

saturated light hydrocarbons ($C_3$-$C_6$ hydrocarbons); water; and carbon dioxide.

Other suitable blowing agents include chemical blowing agents such as carbonate and azo type compounds. Such compounds include, without being limited thereto, ammonium carbonate, ammonium bicarbonate, potassium bicarbonate, sodium bicarbonate, diazoaminobenzene, diazoaminotoluene, azodicarbonamide, diazoisobutyronitrile, and the like.

Metal foils useful in the container sealing materials of the present invention can comprise any metal that is suitable for use in a closure liner or sealant sheet. Choice of a particular metal will depend on the nature of the material to be included in the container to be sealed by the container sealing material of the invention, although aluminum foil is the most common conventional metal foil used for induction sealing purposes, and is particularly preferred. Preferably, the metal foil is aluminum foil having a thickness in the range of about 1 mil to about 2 mils.

Materials suitable for use as a polymer film in the liner, interlayer or sealant sheet portion include, for example, polyolefins such as polyethylene or polypropylene, polyesters such as PET, functionalized polyolefins such as ethylene vinyl alcohol (EVOH) or ethylene vinyl acetate (EVA) polymers, halogenated polyolefins such as polyvinyl chloride (PVC) or polyvinylidene chloride (PVdC), acrylonitrile methacrylate copolymer films (e.g., BAREX® film, BP Chemicals, Inc., Cleveland, Ohio), and the like. The polymer film can be a single layer of polymer, or a multilayer structure comprising two or more layers of polymer bound together. A particularly preferred polymer film is PET film. Preferably, the polymer film has a thickness in the range of about 0.5 to about 2 mils.

Adhesives suitable for securing various layers of the container sealing materials of the invention to one another include epoxy adhesives, solvent-based cements containing synthetic rubber or a phenolic resin, acrylic adhesives, urethane adhesives, or any other suitable adhesive, or a tie-layer. Tie-layers are often used to provide adhesion between a non-polar polymer, such as polyethylene, and a polar polymer such as ethylene vinyl alcohol (EVOH). Typically, tie-layers are functionalized polyolefins such as ethylene acrylic acid copolymers, ethylene vinyl acetate copolymers (EVA), and the like, as is well known in the art. One useful adhesive is the solventless, two-part adhesive system available from Rohm & Haas Corp., Springhouse, Pa., under the trade name MOR-FREE® 403A/C117. Other useful adhesives include two part epoxy resin adhesives, which are well known in the art, and which are available from a variety of manufacturers. Examples of useful adhesives are disclosed in Arthur H. Landrock, *Adhesives Technology Handbook*, Noyes Publications, Park Ridge, N.J. (1985), incorporated herein by reference.

If an adhesive is utilized, a polymeric foam substrate and/or the polymeric film can be surface-treated to improve adhesion. Suitable surface treatments include, without being limited to, chromic acid etching, corona treatment, oxidizing flame treatment, gas plasma treatment, and the like.

Wax-absorbent materials useful in the present invention include, without limitation, paper (e.g., bleached or unbleached Kraft paper, glassine paper, and the like), cellulose pulp (e.g., pulp board), or an absorbent synthetic sheet material such as a nonwoven fabric, an absorbent polymeric foam, a porous polymeric film, and the like. The wax-absorbent material can be can be a single layer of absorbent material, or a multilayer structure comprising two or more layers of absorbent material bound together (e.g, by an adhesive). In any event, the wax-absorbent material is selected to be capable of absorbing a sufficient quantity of the wax layers to cause the liner and the sealant sheet to release from the interlayer.

Nonwoven polymeric fabrics that are useful as wax-absorbent materials include nonwoven polyolefin fabrics and nonwoven polyester fabrics. Suitable nonwoven polyolefin fabrics include nonwoven polyethylene materials, such as a microporous polyethylene film or spunbonded high density polyethylene, as well as nonwoven polypropylene, nonwoven ethylene-propylene copolymer, and nonwoven blends thereof. Suitable nonwoven polyester fabrics include nonwoven polyethylene terephthalate fabrics and spunlaced DACRON® polyester-based fabrics available from E.I. DuPont de Nemours & Co., Inc. of Wilmington, Del. (DuPont), under the trade name SONTARA®. Preferably, the synthetic fabric is an absorbent polyethylene non-woven fabric such as TYVEK® non-woven fabric, available from DuPont, or a microporous polyethylene film sold under the trade name TESLIN® by PPG Industries, Inc., Pittsburgh, Pa.

The thickness of the wax-absorbent material is selected so that the material will absorb a sufficient amount of the wax layers to allow the interlayer to release from the liner and the sealant sheet when the wax is melted. Preferably, the liquid-wax absorbent-material has a thickness in the range of about 1 mil to about 12 mils, more preferably about 2 mils to about 10 mils, and most preferably about 2.5 mils to about 6 mils.

The wax layers preferably comprise paraffin, a microcrystalline wax, a polyethylene wax, a polyisobutylene resin, a butyl rubber resin, a synthetic wax such as a polyamide wax (e.g., a stearamide, an oleamide, or erucamide), or a mixture thereof. More preferably the wax layers each independently are paraffin, a microcrystalline wax, or a combination thereof. Most preferably the wax layers comprise a microcrystalline wax such as a microcrystalline wax emulsion. The wax layers preferably each have a melting point in the range of about 65 to about 150° C. The waxes utilized in the first and second wax layers preferably have substantially similar melting points so that each will liquify completely during inductive heating of a metal foil layer or by conductive heating of the container sealing material, so that the melted wax will be absorbed by the wax-absorbent surface in contact with the wax. Preferably, the first and second wax layers are each about 0.2 to about 2 mils in thickness, more preferably about 0.5 to about 0.75 mils.

A barrier film, when present, preferably comprises a polymeric material having oxygen barrier, moisture barrier, solvent barrier, or toughness (i.e, puncture resistance) properties, as desired, based on the type of contents that will be included within a container sealed by the container seal of the invention. The barrier film can be a single layer of polymer, or a multilayer structure comprising two or more layers of polymer either directly bound to one another or adhesively secured to each other. Non-limiting examples of materials that can be used as a moisture barrier film include vinyl chloride/vinylidene chloride copolymer (i.e., PVC-PVdC) films marketed by Dow Chemical Company under the trademark SARAN®, polyethylene, oriented polypropylene (OPP), OPP/polyvinyl chloride (PVC) laminates, and OPP/PVC-PVdC laminates. Non-limiting examples of materials that can be used as an oxygen barrier film include PVC-PVdC, PET, PVC-PVdC/PET laminates, acrylonitrile methacrylate copolymer films, PVdC, and OPP/PVC-PVdC laminates. Non-limiting examples of solvent resistant films include PET and polyethylene. Non-limiting examples of puncture resistant films include PET and PVC. Preferred barrier films are PET, PVdC, and acrylonitrile methacrylate copolymer films. Preferably the barrier film has a thickness in the range of about 0.5 to about 3 mils.

The heat-sealable film is a thermoplastic material that will soften and bond to a container finish with which it is in contact when heated at temperatures achieved during typical induction or conduction sealing operations, under the pressure exerted by the closure on the die-cut container seal between the closure and the container finish. Typically the pressure on the liner material is achieved by torquing a closure containing the die-cut container seal onto a container finish with a torque in the range of about 15 inch-pounds to about 90 inch-pounds. Examples of materials that can be used as a heat-sealable film include low-density polyethylene, medium density polyethylene, polypropylene, ethylene vinyl acetate (EVA), ionomer films, and amorphous PET. Typically the heat-sealable film is selected to be of the same material as the container finish or of a material that is compatible with the container finish. Accordingly, a polyethylene film would be selected as a heat-sealable film to seal a high-density polyethylene container finish. Similarly, a PET film can be used as the heat-sealable film to seal a PET container finish. If it is desired that the sealant sheet be relatively easy to puncture by the consumer, a biaxially oriented thermoplastic material would be selected as the heat-sealable film. Preferably, the heat sealable film is medium density polyethylene, polypropylene, EVA copolymer, or PET. When a relatively strong, puncture-resistant sealant sheet is desired, a tough barrier film can be included over the heat-sealable film.

The selection of appropriate dimensions for a container seal to be used with a particular closure and container combination is routine for one of ordinary skill in the packaging art. Typically, the dimensions of the container seal are chosen to be substantially equal to the inside diameter of the upper surface of the closure, so that the upper surface of the liner will fit snugly within the closure. The container seal can be sized to be slightly larger than the perimeter of the container finish, so that a portion of the container seal overhang the finish to provide a gripping surface for removing the seal from the container. In addition, a tab can be included on container seal to aid in removing the seal. Methods for providing a tab on a container seal are well known in the packaging arts.

The thickness of the container seal is selected based on the clearance between the upper inside surface of the closure and the finish of a complementary container. Preferably, the thickness of the container seal is selected so that the liner sheet is slightly compressed when the liner is sealed between the closure and a container finish in the absence of the other portions of the container seal. Such compression aids in forming a fluid and/or air-tight seal. Container closures are selected to match container finishes of complementary dimensions and design, as is well known in the packaging art.

The container sealing materials of the present invention can be manufactured using standard coating and lamination techniques that are well known in the art. For example, a substrate layer and a polymer film can be laminated to foil using one or more conventional adhesive(s) to form the liner sheet. The polymer film of the liner sheet can then be laminated to a wax-absorbent interlayer by a first layer of wax. The resulting laminate can then be laminated to tacking surface of a sealant sheet (e.g., a heat-sealable film) by a second layer of wax.

Preferably, the container sealing material of the invention has an overall thickness in the range of about 8 to about 85 mils, more preferably about 20 to about 40 mils. It is preferred that the liner sheet of the material (i.e. the substrate layer, the metal foil and the polymer film) have a thickness in the range of about 10 to about 40 mils. Preferably, the sealant sheet has a total thickness in the range of about 0.5 to about 3 mils, more preferably about 0.5 to about 2 mils.

The container sealing materials of the present invention can be manufactured to full machine width in a master roll form, utilizing standard roll coating and laminating equipment that is well known in the coating and laminating arts. Typically, the master roll of container sealing material is slit to a desired width, and shipped to a closure manufacturer. The closure manufacturer, in turn, die-cuts the slit master roll to the desired disk size for use in particular container closures. The die-cut container seals are then inserted or pressed into the closure with the compressible liner sheet facing into the closure. The container seals are typically held in place in the closure by friction with the cylindrical side wall of the closure, or are glued in place with an adhesive, such as a hot-melt adhesive.

Closures suitable for use with container seals comprising the container sealing materials of the present invention are preferably standard, continuous threaded (CT) closures, which are well known in the art. Such closures are described, for example J. L. Heid and Maynard A. Joslyn, Eds. *Fundamentals of Food Processing Operations Ingredients, Methods, and Packaging*, The AVI Publishing Company, Inc., Westport, Conn. (1967), pp. 649-655.

The container sealing materials of the present invention provide a separable closure liner and container sealant sheet having a releasable interlayer between the liner and the sealant sheet. The three-part design of the container sealing material of the invention provides protective seal for a container and a resealable closure liner in a closure. The interlayer is readily retrievable by a consumer who removes the closure from the container. Preferably, the interlayer includes printed matter such as promotional indicia on one or both of its visible surfaces. Optionally, the liner sheet and/or the sealant sheet can include printed matter, such as a logo or informational message (e.g., "sealed for your protection") on a surface thereof.

It is currently difficult to provide a useful promotional indicia, such as a coupon or proof-of-purchase indicator within a container closure. The container sealing materials of the present invention provide a container seal with a separable interlayer that can serve as a promotional token, such as a coupon. The container seals of the invention afford a convenient solution to the problem of providing promotional materials for a product, service, contest, and the like, under a container closure but not connected to the seal or the liner. The printed matter visible on the surface of the interlayer can include words, symbols, logos, bar codes, holographic images, art work, or any other information desired by the packager, product manufacturer, or retailer. The present invention advantageously provides a freely removable promotional token for use by a consumer when a container closure is removed by a consumer. The promotional token can be manufactured by printing, in register, the promotional indicia onto a master roll or a slit roll of container seal material or imprinting such indicia onto a component material prior to assembling the container sealing material. Sections of container seal for use in a closure can be cut from a master role in register with the printed material on the roll, using equipment and methods that are well known in the art.

It is preferred that the interlayer include printed promotional indicia promoting a product, a service, a contest, or a game, a company, an organization a social or political cause, and the like, on one or both of its surfaces or on a layer subjacent to a surface, so long as the indicia are visible at the surface. More preferably the promotional indicia are in the form of a redeemable coupon, a proof-of-purchase indicator, or a game token. The promotional indicia can be printed in single or multicolor inks, as desired. The interlayer can also include a holographic image, if desired. Holographic images are typically film laminates having a hologram imbedded within a polymeric film layer. The use of a holographic image can provide security against counterfeiting, which could be useful for promotions involving high value sweepstakes, for example.

Another aspect of the present invention is a container sealed with a container sealing material as described hereinabove. Preferably the interlayer portion of the container sealing material includes printed promotional indicia, which promotes a product, a service, or a game (e.g., a sweepstakes, contest, and the like).

Yet another aspect of the present invention is a method of providing a readily retrievable promotional token within a container closure. The method comprises securing a closure over the finish of a container, in which the closure includes a container seal of the invention. The container seal has promotional indicia visible on at least one surface of the interlayer portion of the container seal. The container seal is sized to fit within the closure and over the surface of the container finish. The container seal is secured to the inside of the closure, preferably by an adhesive between the closure and the closure-contacting surface of the container seal. After the closure is secured over the container finish the container seal is heated to a temperature sufficient to bond the heat-sealable container-contacting surface of the sealant sheet to the finish of the container and to melt the wax layers of the container seal and release the liner and the sealant sheets from the interlayer portion. The container-contacting surface of the container seal provides a seal over the container finish. When a consumer removes the closure from the container, the consumer can retrieve the loose interlayer portion as promotional token.

Numerous variations and modifications of the embodiments described above may be effected without departing from the spirit and scope of the novel features of the invention. No limitations with respect to the specific embodiments illustrated herein are intended or should be inferred.

We claim:

1. A container sealing material comprising a liner sheet, a sealant sheet, and an interlayer portion bound therebetween;
   the liner sheet having a closure-contacting surface and a tacking surface, the liner sheet comprising at least one layer of a compressible material;
   the interlayer portion having a first tacking surface and a second tacking surface;
   the sealant sheet having a tacking surface and a heat-sealable surface;
   the tacking surface of the liner sheet being bound to the first tacking surface of the interlayer portion by a first layer of wax;
   the tacking surface of the sealant sheet being bound to the second tacking surface of the interlayer portion by a second layer of wax;
   at least one of the tacking surface of the liner sheet and the first tacking surface of the interlayer portion being capable of absorbing a sufficient amount of liquid wax from the first layer of wax to cause the liner sheet to release from the interlayer portion when the first layer of wax is melted; and
   at least one of the tacking surface of the sealant sheet and the second tacking surface of the interlayer portion being capable of absorbing a sufficient amount of liquid wax from the second layer of wax to cause the sealant sheet to release from the interlayer portion when the second layer of wax is melted;
   wherein the liner sheet and the sealant sheet both release from the interlayer portion when sufficient heat is applied to the container sealing material to bond the heat-sealable surface of the sealant sheet to a container finish with which it is in contact, thereby leaving the interlayer portion loosely disposed between the sealant sheet and the liner sheet.

2. The container sealing material of claim 1 wherein at least one of the liner sheet, the interlayer portion, and the sealant sheet comprises a layer of metal foil.

3. The container sealing material of claim 1 wherein the first and second layers of wax each have a melting point in the range of about 65 to about 150° C.

4. The container sealing material of claim 1 wherein the layer of compressible material of the liner sheet is a layer of cellulose pulp or a layer of polymeric foam.

5. The container sealing material of claim 1 wherein at least one of the tacking surface of the liner sheet and the first tacking surface of the interlayer portion is a layer of paper or a layer of synthetic fabric.

6. The container sealing material of claim 1 wherein at least one of the tacking surface of the sealant sheet and the second tacking surface of the interlayer portion is a layer of paper or a layer of synthetic fabric.

7. The container sealing material of claim 1 wherein the closure-contacting surface of the liner sheet is a layer of compressible material and the tacking surface of the liner sheet is a polymer film.

8. The container sealing material of claim 7 wherein the liner sheet further includes a layer of metal foil bound between the closure-contacting surface and the tacking surface thereof.

9. The container sealing material of claim 8 wherein the metal foil comprises aluminum.

10. The container sealing material of claim 9 wherein the liner sheet further includes a layer of paper bound between the closure-contacting surface and the tacking surface thereof.

11. The container sealing material of claim 1 wherein the closure-contacting surface of the liner sheet is a layer of compressible material and the tacking surface of the liner sheet is a layer of wax-absorbent material.

12. The container sealing material of claim 11 wherein the sealant sheet comprises a barrier film which is bound to a heat-sealable polymer film.

13. The container sealing material of claim 1 wherein the heat-sealable surface of the sealant sheet comprises a heat-sealable polymer film and the tacking surface of the sealant sheet comprises a layer of aluminum foil bound thereto.

14. The container sealing material of claim 1 wherein the interlayer portion comprises a single sheet of wax-absorbent material capable of absorbing a sufficient amount of liquid wax from both the first land second layers of wax to cause both the liner sheet and the sealant sheet to release from the interlayer portion when the first and second layers of wax are melted.

15. The container sealing material of claim 1 wherein the interlayer portion includes printed matter visible on at least one surface thereof.

16. The container sealing material of claim 15 wherein the printed matter includes promotional indicia.

17. The container sealing material of claim 16 wherein promotional indicia are present in the form of a coupon, a proof-of-purchase indicator or a game token.

18. A container sealing material suitable for induction sealing a container, the container sealing material comprising a liner sheet, a sealant sheet, and an interlayer portion bound therebetween;
- the liner sheet having a compressible closure-contacting surface and a tacking surface;
- the interlayer portion having a first tacking surface and a second tacking surface;
- the sealant sheet having a tacking surface and a heat-sealable surface;
- the tacking surface of the liner sheet being bound to the first tacking surface of the interlayer portion by a first layer of wax;
- the tacking surface of the sealant sheet being bound to the second tacking surface of the interlayer portion by a second layer of wax;
- at least one of the tacking surface of the liner sheet and the first tacking surface of the interlayer portion being a layer of wax-absorbent material capable of absorbing a sufficient amount of liquid wax from the first layer of wax to cause the liner sheet to release from the interlayer portion when the first layer of wax is melted; and
- at least one of the tacking surface of the sealant sheet and the second tacking surface of the interlayer portion being a layer of wax-absorbent material capable of absorbing a sufficient amount of liquid wax from the second layer of wax to cause the liner sheet to release from the interlayer portion when the second layer of wax is melted;
- at least one of the liner sheet, the interlayer portion, and the sealant sheet including a layer of metal foil;
- wherein the first and second layers of wax each melt and release the interlayer portion from the liner sheet and the sealant sheet when sufficient heat is applied to the container sealing material to bond the heat-sealable surface of the sealant sheet to a container finish with which it is in contact, thereby leaving the interlayer portion loosely disposed between the sealant sheet and the liner sheet.

19. The container sealing material of claim 18 wherein the sealant sheet includes a layer of barrier film.

20. The container sealing material of claim 18 wherein the liner sheet further includes a layer of metal foil bound between the closure-contacting surface and the tacking surface thereof.

21. The container sealing material of claim 18 wherein the tacking surface of the liner sheet is a layer of wax-absorbent material.

22. The container sealing material of claim 18 wherein the sealant sheet is substantially transparent, the heat-sealable surface of the sealant sheet comprising a heat-sealable polymer film and the tacking surface of the sealant sheet comprising a barrier film bound to the heat-sealable film.

23. The container sealing material of claim 18 wherein the interlayer portion is a single sheet of wax-absorbent material capable of absorbing a sufficient amount of liquid wax from both the first and second layers of wax to cause both the liner sheet and the sealant sheet to release from the interlayer portion when the first and second layers of wax are melted.

24. The container sealing material of claim 23 wherein the interlayer portion includes printed matter visible on at least one surface thereof.

25. The container sealing material of claim 24 wherein the printed matter includes promotional indicia.

26. The container sealing material of claim 25 wherein promotional indicia are present in the form of a coupon, a proof-of-purchase indicator or a game token.

\* \* \* \* \*